(12) United States Patent
Kato

(10) Patent No.: US 10,645,238 B2
(45) Date of Patent: May 5, 2020

(54) IMAGE PROCESSING DEVICE, IMAGE PROCESSING SYSTEM, AND CONTROL METHOD OF IMAGE PROCESSING DEVICE

(71) Applicants: KABUSHIKI KAISHA TOSHIBA, Tokyo (JP); TOSHIBA TEC KABUSHIKI KAISHA, Tokyo (JP)

(72) Inventor: Hiroyuki Kato, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/458,791

(22) Filed: Jul. 1, 2019

(65) Prior Publication Data
US 2019/0327370 A1    Oct. 24, 2019

Related U.S. Application Data

(63) Continuation of application No. 15/941,171, filed on Mar. 30, 2018, now Pat. No. 10,389,896.

(30) Foreign Application Priority Data

Jun. 21, 2017 (JP) ................................. 2017-121294

(51) Int. Cl.
*H04N 1/00* (2006.01)
*G06F 3/12* (2006.01)
*H04N 1/44* (2006.01)

(52) U.S. Cl.
CPC ....... *H04N 1/00411* (2013.01); *G06F 3/1204* (2013.01); *G06F 3/1225* (2013.01);
(Continued)

(58) Field of Classification Search
CPC .......... H04N 1/00411; H04N 1/00514; H04N 1/0048; H04N 1/00503; H04N 1/4413;
(Continued)

(56) References Cited

U.S. PATENT DOCUMENTS 9,800,752 B2    10/2017  Hirasawa
2007/0260903 A1  11/2007  Liu et al.
(Continued)

FOREIGN PATENT DOCUMENTS

JP    2016-131023 A    7/2016

OTHER PUBLICATIONS

Extended European Search Report dated Nov. 2, 2018, filed in counterpart European Patent Application No. 18176266.7, 10 pages.

*Primary Examiner* — Tammy Paige Goddard
*Assistant Examiner* — Darryl V Dottin
(74) *Attorney, Agent, or Firm* — Kim & Stewart LLP

(57) ABSTRACT

An image processing device includes a display unit and a processor configured to determine whether or not functions of the image processing device are executable by the image processing device, and cause the display unit to display a screen including a first item corresponding to a first function that is determined to be executable and a second item corresponding to a second function that is determined to be not executable. The first item is displayed on the screen in a first display format, and the second item is displayed on the screen in a second display format that is less conspicuous than the first display format.

12 Claims, 11 Drawing Sheets

(52) U.S. Cl.
CPC ......... *G06F 3/1286* (2013.01); *H04N 1/0048* (2013.01); *H04N 1/00503* (2013.01); *H04N 1/00514* (2013.01); *H04N 1/00244* (2013.01); *H04N 1/4413* (2013.01); *H04N 2201/0094* (2013.01)

(58) Field of Classification Search
CPC ........ H04N 1/00244; H04N 2201/0094; G06F 3/1204; G06F 3/1286; G06F 3/1225
USPC ...................................................... 358/1.15
See application file for complete search history.

(56) References Cited

U.S. PATENT DOCUMENTS

| | | |
|---|---|---|
| 2008/0086703 A1 | 4/2008 | Flynt et al. |
| 2009/0199109 A1 | 8/2009 | Doui |
| 2010/0231946 A1 | 9/2010 | Shozaki et al. |
| 2011/0007351 A1 | 1/2011 | Kurumasa et al. |
| 2016/0316088 A1 | 10/2016 | Negoro |

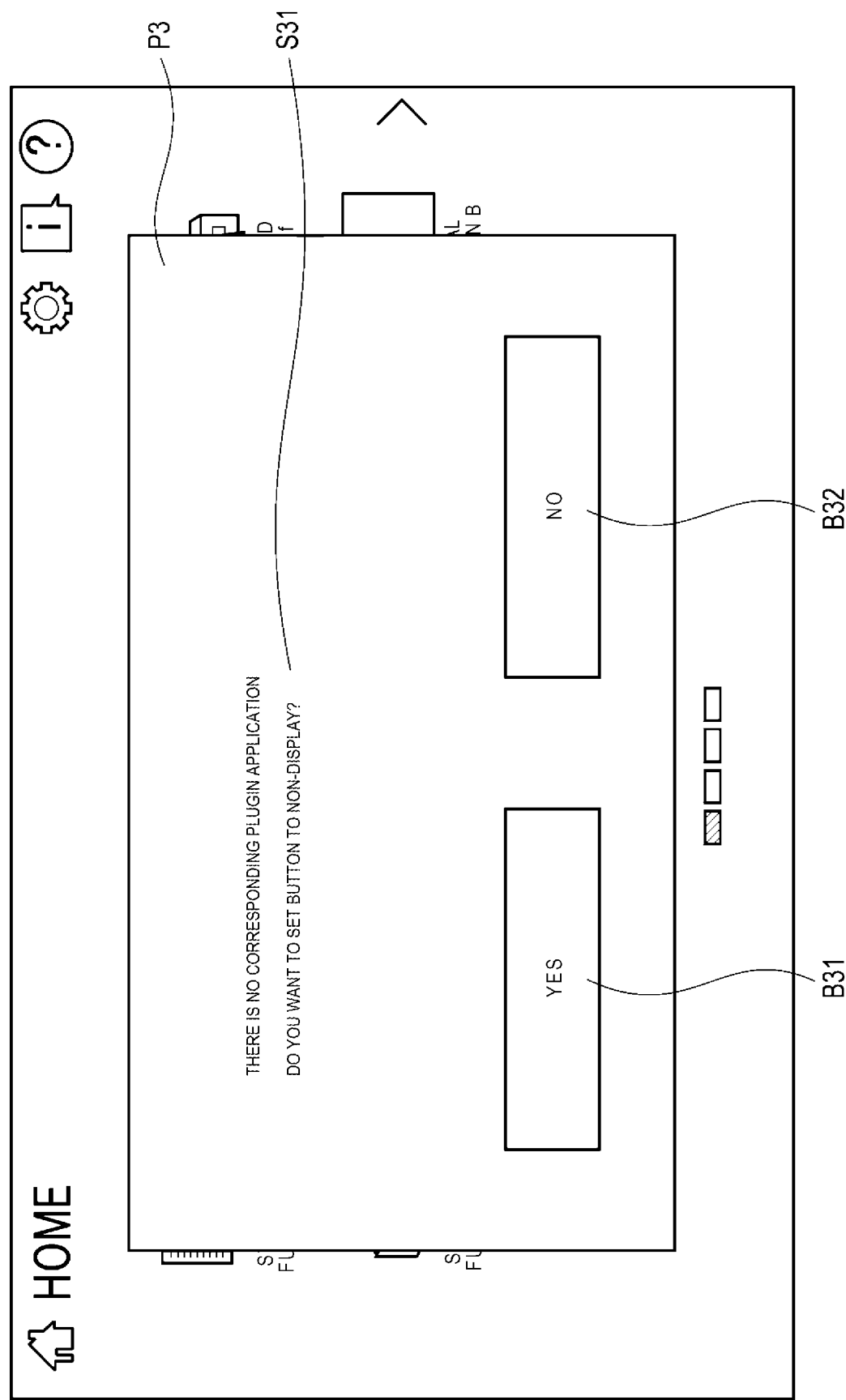

IMAGE PROCESSING DEVICE, IMAGE PROCESSING SYSTEM, AND CONTROL METHOD OF IMAGE PROCESSING DEVICE

CROSS-REFERENCE TO RELATED APPLICATIONS

This application is a continuation of U.S. patent application Ser. No. 15/941,171, filed on Mar. 30, 2018, which is based upon and claims the benefit of priority from Japanese Patent Application No. 2017-121294, filed on Jun. 21, 2017, the entire contents of each of which are incorporated herein by reference.

FIELD

Embodiments described herein relate generally to an image processing device, an image processing system, and a control method of the image processing device.

BACKGROUND

Some image processing systems include a plurality of image forming apparatuses that are connected to a network such as a local area network (LAN). In such image processing systems, it is known for the plurality of image forming apparatuses connected to the network to display a common home screen, which may be customized. However, executable functions of the image forming apparatuses may be different. As such, when the image forming apparatuses display a common home screen, there may be a case where an object such as a button corresponding to an unusable function is displayed.

DESCRIPTION OF THE DRAWINGS

FIGS. 11 and 12 illustrate additional examples of a screen which is displayed on the touch panel in FIG. 1.

DETAILED DESCRIPTION

Embodiments provide an image processing device, an image processing system, and a control method of the image processing device in which the possibility of a user selecting an object corresponding to an unusable function is reduced.

In general, according to an embodiment, there is provided an image processing device which includes a display unit and a processor configured to determine whether or not functions of the image processing device are executable by the image processing device, and cause the display unit to display a screen including a first item corresponding to a first function that is determined to be executable and a second item corresponding to a second function that is determined to be not executable. The first item is displayed on the screen in a first display format, and the second item is displayed on the screen in a second display format that is less conspicuous than the first display format.

Hereinafter, an image processing system according to an embodiment will be described, using drawings.

Figure 1:
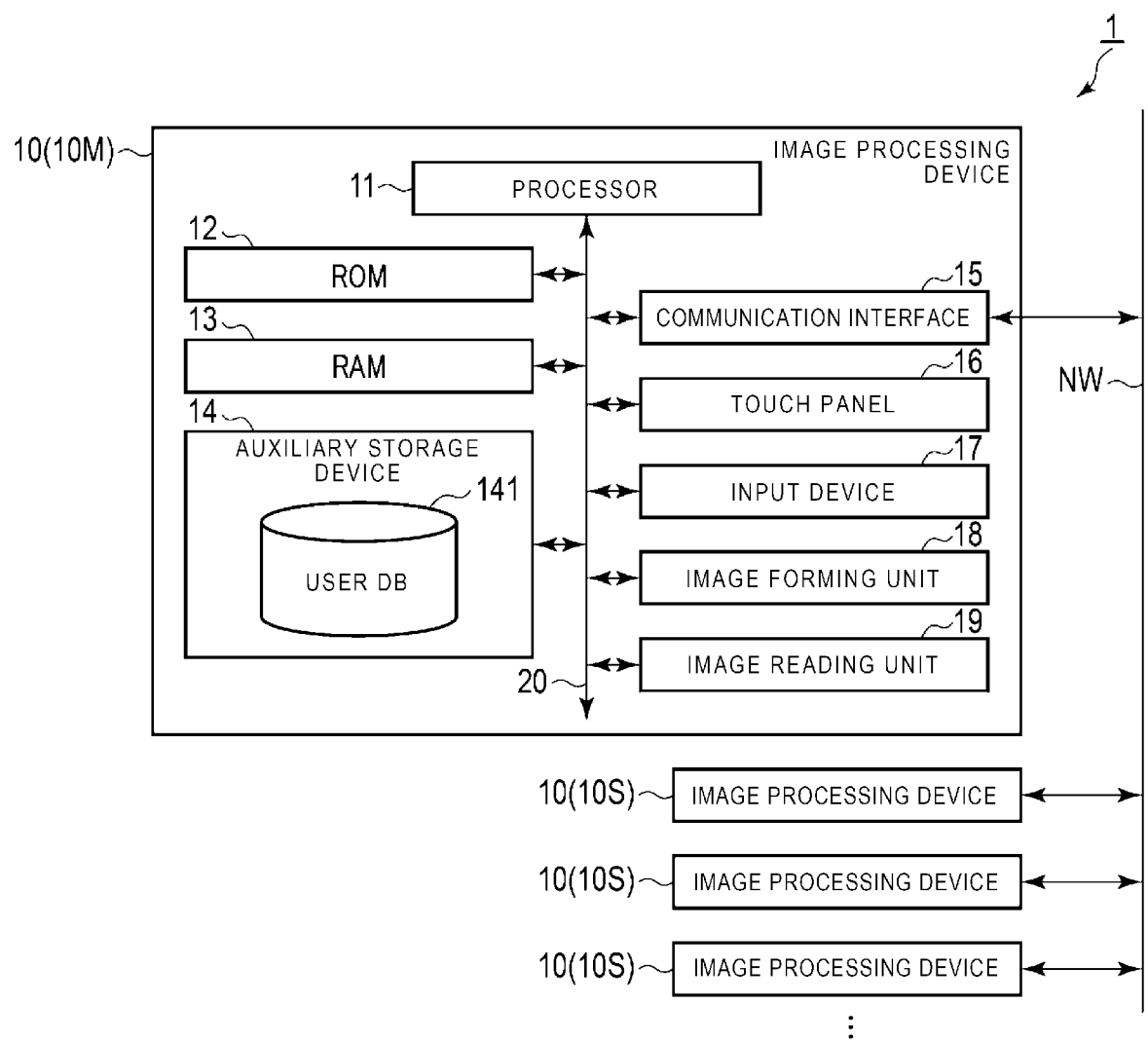
FIG. 1 is a block diagram of an image processing system according to an embodiment, and a circuit configuration of main hardware components of an image processing device which is included in the image processing system.

FIG. 1 is a block diagram of an image processing system 1 according to the embodiment, and a circuit configuration of hardware components of the image processing system 1. The image processing system 1 includes a plurality of image processing devices 10. The respective image processing devices 10 are connected to a network NW. The network NW is, for example, a communication network which includes a private network such as an intranet, an in-house LAN, or a home LAN. The network NW may be a communication network including the Internet.

Figure 2:
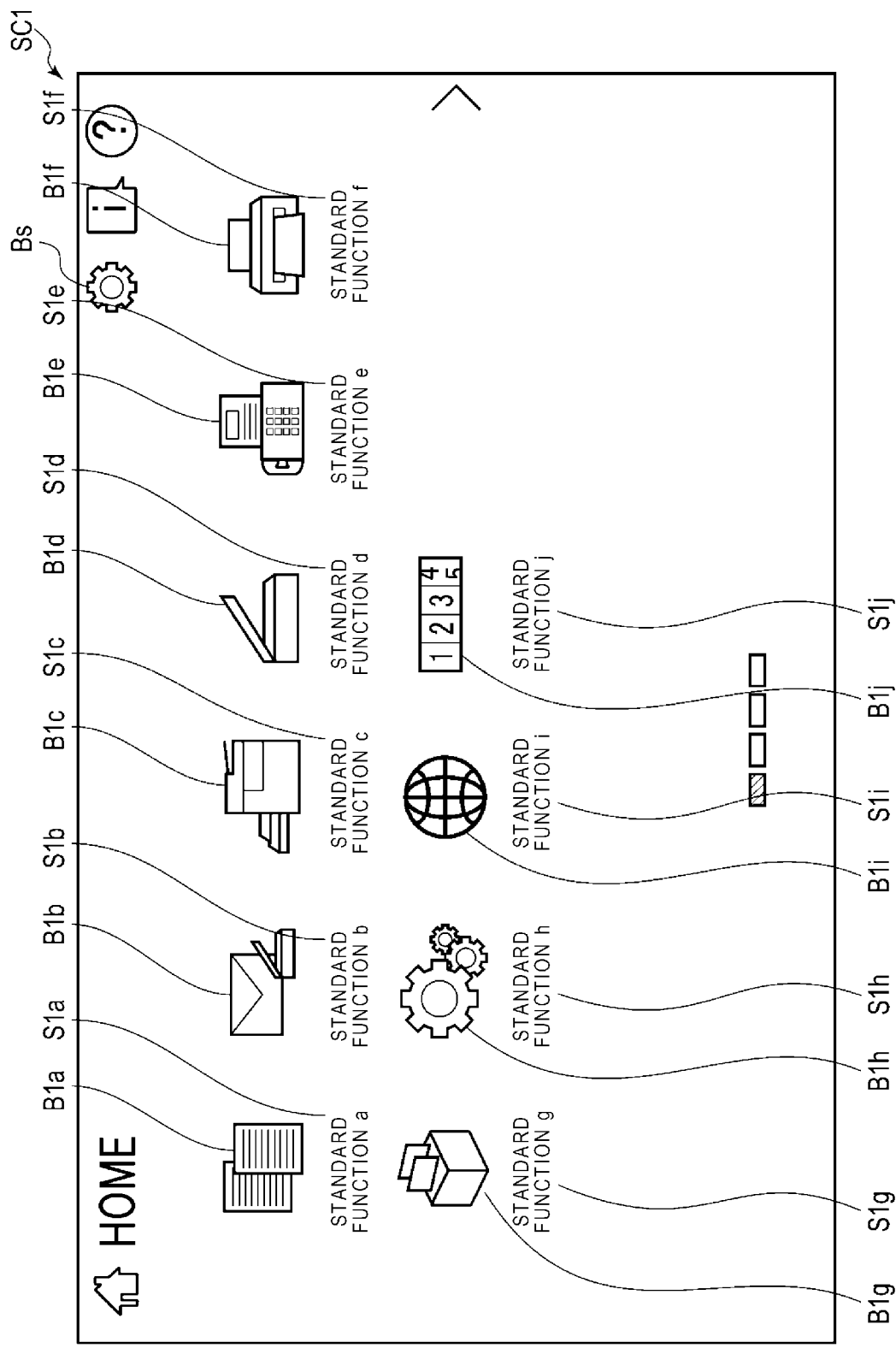
FIG. 2 illustrates an example of a common screen which is displayed on a touch panel in FIG. 1.

When a registered user, who is registered in advance, performs login in any one of the image processing devices 10, the image processing system 1 causes the image processing device 10 to display a home screen which is customized to the registered user who is logging on. That is, in a state in which a registered user does not log in, the common screen SC1 as illustrated in FIG. 2 is displayed on the touch panel 16 of the image processing device 10 as a home screen. In contrast to this, in a state in which a registered user logs in, a customized screen SC2 which is illustrated in FIG. 3 is displayed on the touch panel 16 of the image processing device 10 as a home screen.

FIG. 2 is a diagram which illustrates an example of the common screen SC1. The common screen SC1 includes buttons B1$a$ to B1$i$, a setting button Bs, and character strings S1$a$ to S1$j$. The respective buttons B1$a$ to B1$i$ correspond to functions mounted on the image processing device 10 as standard (hereinafter, referred to as "standard functions"). The respective buttons B1$a$ to B1$i$ are buttons for instructing the image processing device 10 to execute the standard functions. The character strings S1$a$ to S1$j$ correspond to the buttons B1$a$ to B1$i$, respectively, and are names which indicate what the buttons B1$a$ to B1$i$ are for. The setting button Bs is a button for instructing the image processing device 10 to display a setting screen for checking or changing setting of the image processing device 10 on the touch panel 16. In addition, the buttons B1$a$ to B1$i$ are collectively referred to as a button B1. As illustrated in FIG. 2, the number of buttons B1 is an example, and the number is not limited.

Figure 3:
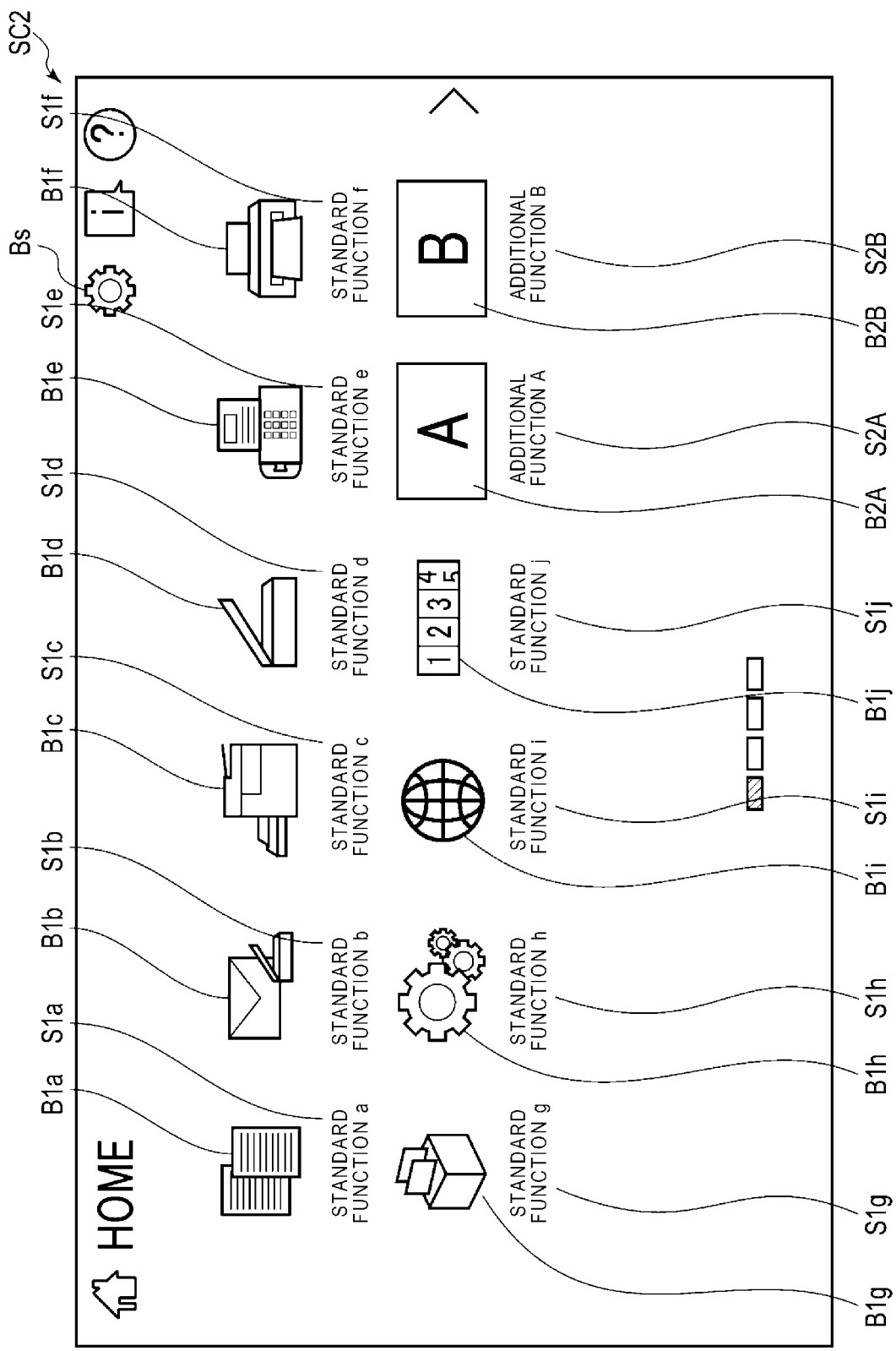
FIG. 3 illustrates an example of a customized screen which is displayed on the touch panel in FIG. 1.

FIG. 3 is a diagram which illustrates an example of the customized screen SC2. The customized screen SC2 includes additional buttons B2A and B2B, and character strings S2A and S2B, in addition to the same elements as those in the common screen SC1. The respective additional buttons B2A and B2B correspond to a function, or the like, which is additionally mounted on the image processing device 10 later (hereinafter, referred to as "additional function"). The additional buttons B2A and B2B are buttons for instructing the image processing device 10 to execute a corresponding additional function. The character strings S2A and S2B correspond to the additional buttons B2A and B2B, respectively, and are names which indicate what the additional buttons B2A and B2B are for. In addition, the additional buttons B2A and B2B are collectively referred to as an additional button B2. The number of additional buttons B2 illustrated in FIG. 3 is an example, and the number is not limited. The additional button is an example of an object.

The image processing device 10 is, for example, an image processing device such as a printer, a copy machine, or a multifunction peripheral (MFP). The image processing device 10 has various functions such as scanning, printing, and copying. In the image processing device 10, operations in a plurality of modes including a master mode and a slave mode are possible. In addition, in which mode the image processing device 10 is operated depends on its setting. The setting of the image processing device 10 is changed based on operations on the touch panel 16 and the input device 17, for example. In the image processing system 1 illustrated in FIG. 1, one image processing device 10 is operated in the master mode, and other image processing devices 10 are operated in the slave mode. In addition, the image processing device 10 operated in the master mode is referred to as an "image processing device 10M". In addition, image processing devices 10 which are operated in the slave mode are referred to as "image processing devices 10S". When it is not necessary to distinguish between the master mode and the slave mode, e.g., when both of the master mode and the slave mode are set to targets, and the like, the image processing device is simply referred to as the "image processing device 10".

The image processing device 10 includes a processor 11, a read only memory (ROM) 12, a random access memory (RAM) 13, an auxiliary storage device 14, a communication interface 15, a touch panel 16, the input device 17, an image forming unit 18, an image reading unit 19, and a bus 20.

The processor 11 corresponds to a nerve center of a computer which performs processing and control which are necessary for the operation of the image processing device 10. The processor 11 controls each unit of the image processing device 10 to execute various functions thereof, based on system software, application software, or firmware stored in the ROM 12, the auxiliary storage device 14, or the like. The processor 11 is, for example, a central processing unit (CPU), a micro processing unit (MPU), a system on a chip (SoC), a digital signal processor (DSP), a graphics processing unit (GPU), or the like. Alternatively, the processor 11 is a combination thereof. The processor 11 is an example of a control unit.

The ROM 12 is a non-volatile memory which is read-only. The ROM 12 stores the above described program(s). The ROM 12 also stores data, various setting values, or the like, which are used when the processor 11 performs various processing.

The RAM 13 is a memory which is used in reading and writing of data. The RAM 13 stores data which is temporarily used when the processor 11 performs various processing, and is used as a so-called work area.

The auxiliary storage device 14 is, for example, an electric erasable programmable read-only memory (EEPROM), a hard disk drive (HDD), a solid state drive (SSD), or the like. In addition, the image processing device 10 may be provided with an interface such as a card slot into which a recording medium such as a memory card, or a universal serial bus (USB) memory can be inserted, instead of, or in addition to the auxiliary storage device 14.

The auxiliary storage device 14 may also store the above described program. In addition, the auxiliary storage device 14 keeps data which is necessary when the processor 11 performs various processing, data generated by processing in processor 11, various setting values, or the like. In addition, when application software for providing an additional function on the image processing device 10 (hereinafter, referred to as "plugin application") is installed, the auxiliary storage device 14 stores the plugin application. The auxiliary storage device 14 of the image processing device 10M stores various plugin applications in a state in which the plugin applications can be distributed to other image processing devices 10S.

In addition, the auxiliary storage device 14 stores a user database (DB) 141 including information related to each registered user. The user DB 141 stores information which is necessary when displaying a customized screen for each of the registered users, and various information other than that, for each of the registered users, in association with respective unique user identifiers (ID) which are associated with each of the registered users. A user DB 141 stored in the image processing device 10M is referred to as a user DB 141M, and a user DB 141 stored in the image processing device 10S is referred to as a user DB 141S. In addition, descriptions of a method in which a user who is not a registered user becomes a registered user by registering various information in the user DB 141 will be omitted, since this method is well-known.

The auxiliary storage device 14 of the image processing device 10M further stores a unique apparatus ID which is associated with the respective image processing devices 10, a list of plugin applications which are installed, an installation location, and an IP address, with respect to the respective image processing devices 10S and the image processing device 10M.

Figure 4:
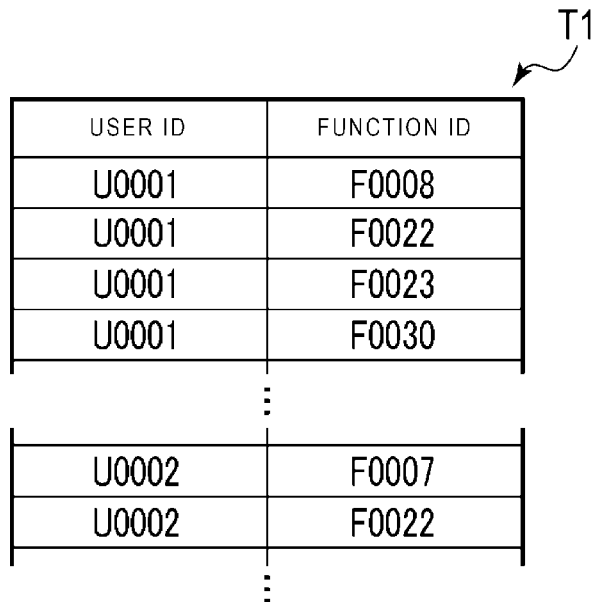
FIG. 4 is a diagram which illustrates an example of a table included in a user DB in FIG. 1.
Figure 5:
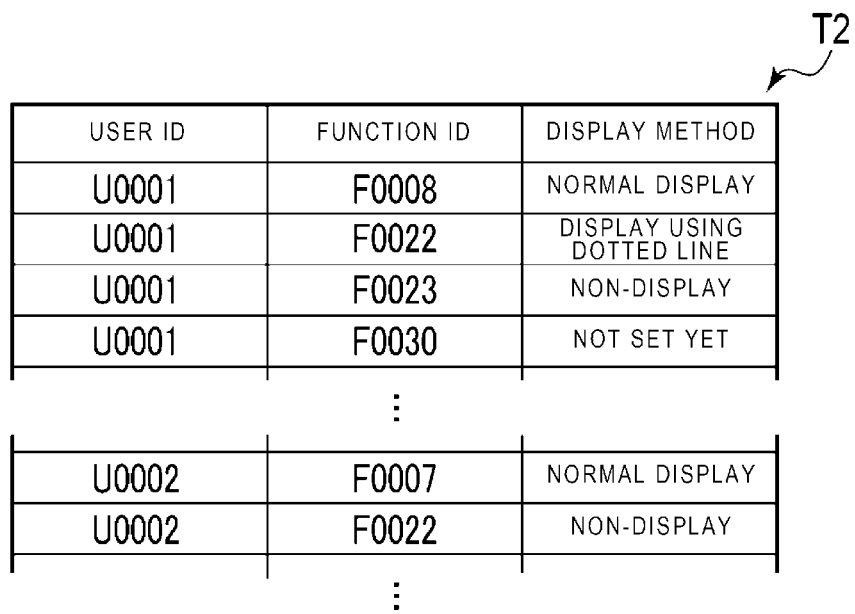
FIG. 5 is a diagram which illustrates an example of a table included in the user DB in FIG. 1.

The user DB 141M includes a table T1 which is illustrated in FIG. 4. The table T1 causes a user ID, and a unique function ID which is associated with the respective additional functions to be associated with each other. An additional button corresponding to a function ID which is associated with a user ID is displayed on a customized screen corresponding to the user ID.

Figure 6:
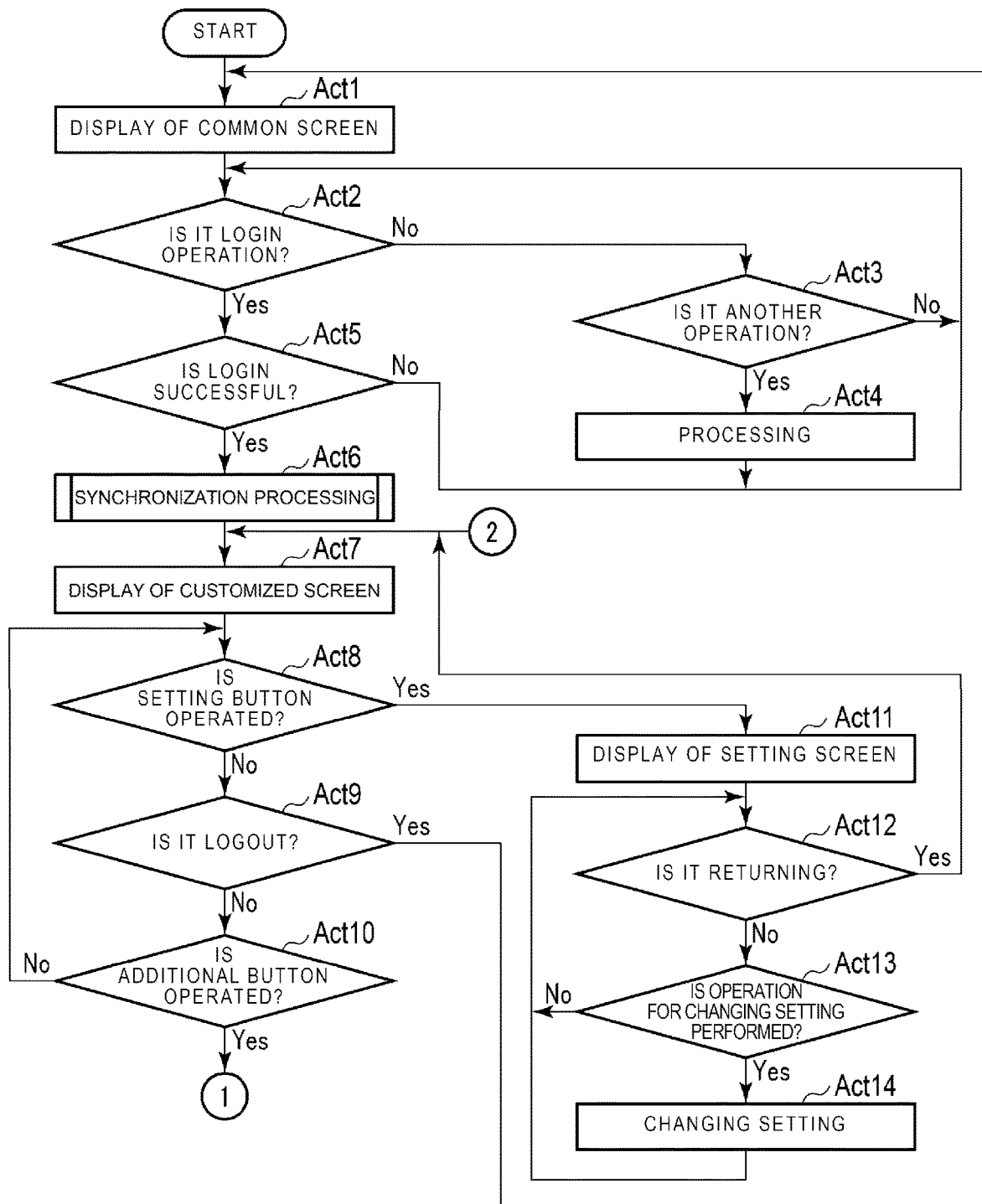
FIGS. 6 and 7 depict a flowchart of control processing which is performed by a processor of the image processing system in FIG. 1.

The user DB 141S and the user DB 141M include, for example, a table T2 which is illustrated in FIG. 6. The table T2 causes a user ID, a function ID, and a display method corresponding to the respective function IDs to be associated with each other. The display method shows how to display an additional button when displaying a customized screen corresponding to the user ID, in the image processing device 10 which stores the table T2. The table T2 is an example of display data for displaying a screen which is synchronized among a plurality of image processing devices.

The touch panel 16 functions as a display device which displays a screen for informing an operator of the image processing device 10 of various information. In addition, the touch panel 16 functions as an input device which receives a touch operation of the operator. The touch panel 16 is an example of a display unit which displays a screen. The display device is an example of the display unit.

The input device 17 receives an operation of an operator of the image processing device 10. The input device 17 is a keyboard, a mouse, a touch pad, or the like, for example.

The image forming unit 18 forms an image, or the like, on a sheet-shaped recording medium such as paper. For this reason, the image forming unit 18 is provided with a printer such as a laser printer, or an ink jet printer, for example.

The image reading unit 19 reads an image from a sheet-shaped recording medium such as paper. For this reason, the image reading unit 19 is provided with a scanner, or the like. The scanner is, for example, a type of a reduced optical system in which an imaging element such as a chargecoupled device (CCD) image sensor is provided. Alternatively, the scanner is, for example, a contact image sensor (CIS) type which is provided with an imaging element such as a complementary metal-oxide-semiconductor (CMOS) image sensor. Alternatively, the scanner may be of other well-known types.

The bus 20 includes a control bus, an address bus, a data bus, or the like, and transmits a signal which is delivered in each unit of the image processing device 10.

Hereinafter, an operation of the image processing system 1 according to the embodiment will be described based on FIGS. 2 to 12. In addition, contents of processing in the following operation descriptions are an example, and it is possible to appropriately use various processing from which the same result can be obtained.

Figure 7:
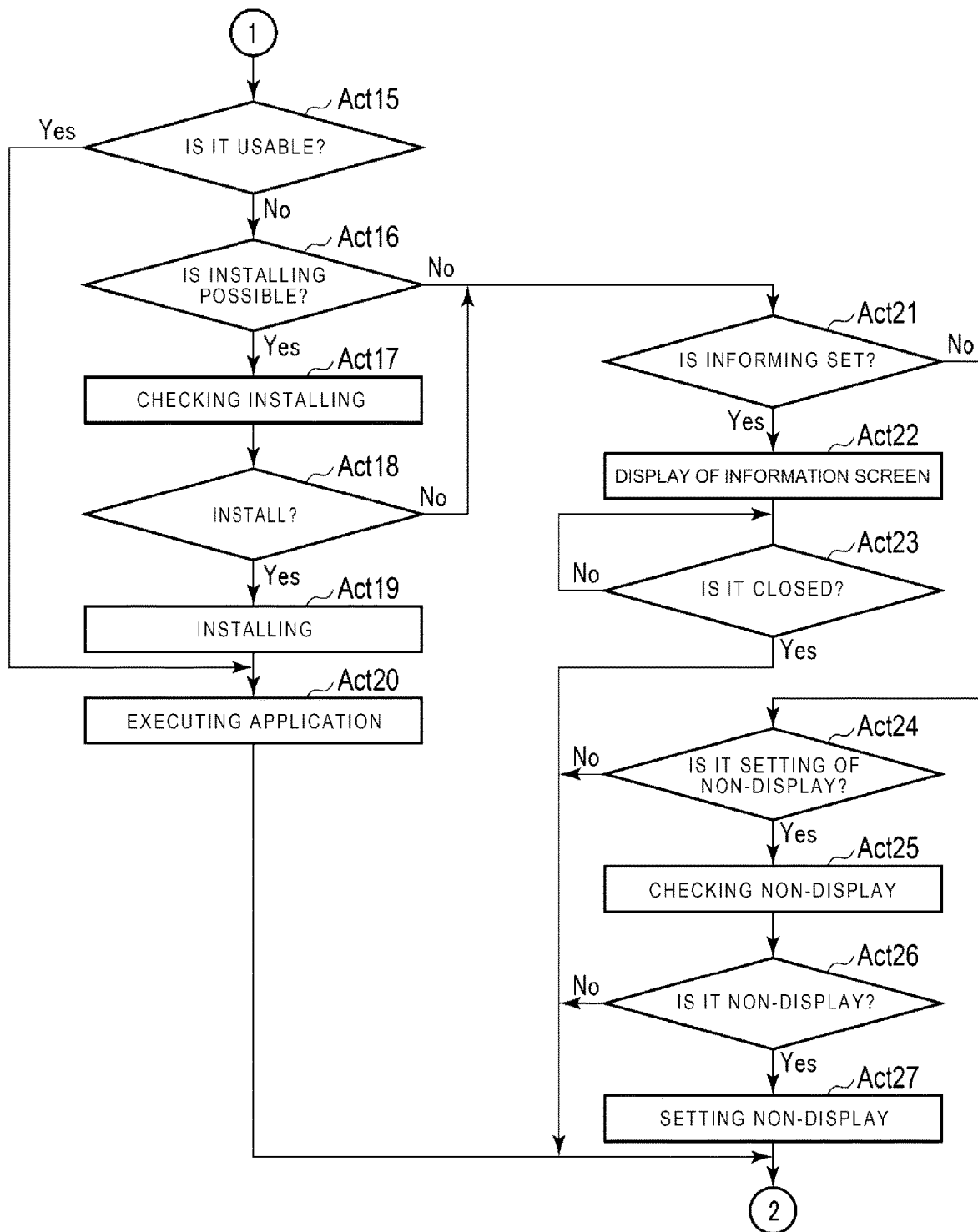
Figure 8:
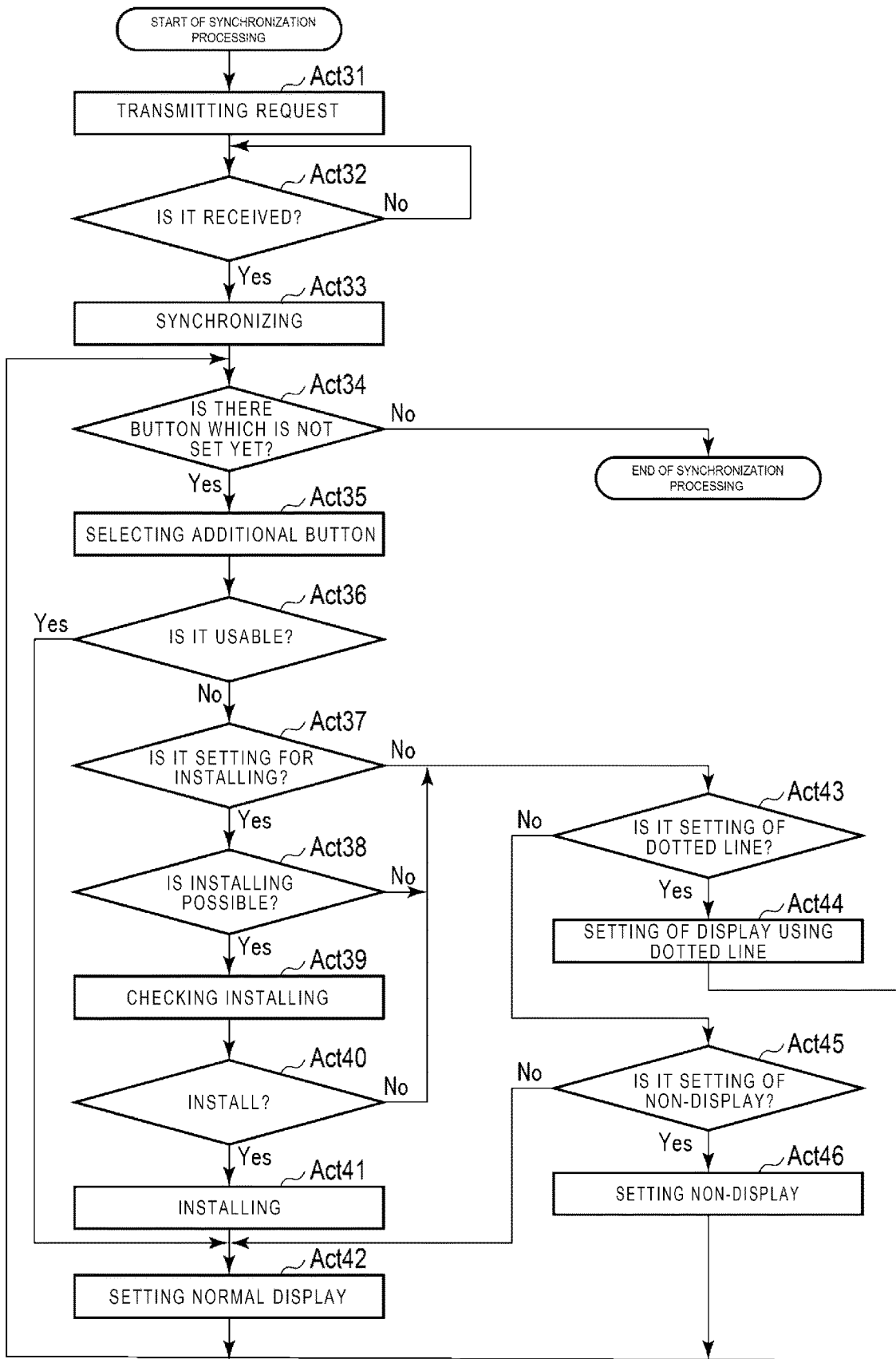
FIG. 8 is a flowchart of synchronization processing which is performed by the processor of the image processing system in FIG. 1.

FIGS. 6 to 8 are flowcharts of control processing using the processor 11 of the image processing device 10S (hereinafter, referred to as "processor 11S"). The processor 11S executes the control processing based on the control program stored in the ROM 12, the auxiliary storage device 14, or the like.

The processor 11S in Act 1 in FIG. 6 generates an image corresponding to the common screen SC1 which is illustrated in FIG. 2. In addition, the processor 11S instructs the touch panel 16 to display the generated image. Upon receiving the instruction, the touch panel 16 displays the common screen SC1. The common screen SC1 is a screen which is displayed on the touch panel 16 when a registered user has not logged in.

In Act 2, the processor 11S determines whether or not a login operation is performed. The processor 11S determines No in Act 2, and proceeds to Act 3, when a login operation is not performed.

In Act 3, the processor 11S determines whether or not an operation other than the login operation is performed. When an operation other than the login operation is not performed, the processor 11S determines No in Act 3, and returns to Act 2. In this manner, the processor 11S repeats Act 2 and Act 3 until some operation is performed.

When an operation other than the login operation is performed in a standby state in Act 2 and Act 3, the processor 11S determines Yes in Act 3, and proceeds to Act 4.

In Act 4, the processor 11S performs processing corresponding to the operation. The processor 11S returns to Act 2 after the processing in Act 4.

An operator who logs into the image processing device 10S performs the following login operation. That is, the operator operates the touch panel 16 and the input device 17, for example, and inputs a password corresponding to a user ID. Alternatively, for example, the operator causes his ID card to be read by a card reader provided in the image processing device 10S. The ID card stores information such as a user ID which is necessary for login.

When a login operation is performed in the standby state in Act 2 and Act 3, the processor 11S determines Yes in Act 2, and proceeds to Act 5.

In Act 5, the processor 11S determines whether or not it is successful in login. In addition, the processor 11S determines whether or not the login is successful by referring to the user DB 141S or the user DB 141M, for example. In addition, since it is possible to use a well-known method for processing the login, descriptions thereof will be omitted. When the login is successful, the processor 11S determines Yes in Act 5, and proceeds to Act 6. Hereinafter, a user ID of a user which is successful in login will be referred to as a "login user ID".

In Act 6, the processor 11S performs synchronization processing illustrated in FIG. 8.

In Act 31 in FIG. 8, the processor 11S generates a request for requesting a transmission of the table T1 to the image processing device 10M. In addition, the processor 11S instructs the communication interface 15 to transmit the generated request to the image processing device 10M. Upon receiving the request, the communication interface 15 transmits the request to the image processing device 10M. The transmitted request is received by a communication interface 15 of the image processing device 10M. After the processing in Act 31, the processor 11S proceeds to Act 32.

Meanwhile, a processor 11 of the image processing device 10M (hereinafter, referred to as "processor 11M") stands by to receive a request using the communication interface 15. When a request is received, the processor 11M instructs the communication interface 15 to transmits the table T1 to the image processing device 10S. Upon receiving the instruction, the communication interface 15 transmits the table T1 to the image processing device 10S. The transmitted table T1 is received by the communication interface 15 of the image processing device 10S.

Meanwhile, in Act 32, the processor 11S of the image processing device 10S stands by to receive the table T1 using the communication interface 15. Upon receiving the table T1, the processor 11S determines Yes in Act 32, and proceeds to Act 33.

In Act 33, the processor 11S causes a portion of the table T2 related to the login user ID to synchronize with the table T1. That is, the processor 11S compares a record in the table T1, in which a value of a user ID field is the login user ID with a record in the table T2, in which a value of a user ID field is the login user ID. In addition, when there is a functional ID which is included in the table T1, but it is not included in the table T2, in the compared record, the processor 11S adds a new record to the table T2 for each of the functional IDs. In addition, the processor 11S sets a value of a user ID field of the new record to a login user ID, a value of a functional ID field to the functional ID, and a value of a display method field to "not set yet". In addition, when there is a functional ID which is included in the table T2, but it is not included in the table T1, in the compared record, the processor 11S deletes the record for that functional ID in the table T2. After the processing in Act 33, the processor 11S proceeds to Act 34.

In Act 34, the processor 11S checks whether or not there is an additional button of which a display method to display in a customized screen related to a user who is in the middle of logging in, has not been set yet. That is, the processor 11S checks whether or not there is a record in which a value of the user ID field is the login user ID, and of which a display method is not set yet, in the table T2. When there is an additional button of which a display method is not set yet, the processor 11S determines Yes in Act 34, and proceeds to Act 35.

In Act 35, the processor 11S selects one additional button which is determined to be Yes in the processing in Act 34. That is, the processor 11S selects one record for which a display method is not set yet in Act 35. After the processing in Act 35, the processor 11S proceeds to Act 36.

In Act 36, the processor 11S determines whether or not it is possible to use the function corresponding to the additional button selected in Act 35 (such function referred to hereinafter as "the additional function"). That is, the processor 11S determines whether or not it is possible to use the additional function which is specified in a function ID included in the record which is selected in Act 35. In addition, the case in which the additional function is unusable is, for example, where a plugin application corresponding to the additional function (hereinafter, referred to as "corresponding plugin application") is not installed in the image processing device 10S. When the corresponding additional function can be used, the processor 11S determines Yes in Act 36, and proceeds to Act 42. In contrast to this, when the corresponding additional function is unusable, the processor 11S determines No in Act 36, and proceeds to Act 37.

The processing in Act 36 is an example of processing to determine whether the additional function is executable or non-executable.

In Act 37, the processor 11S determines whether or not the image processing device 10S is set so that a corresponding plugin application is to be installed. When it is set so that the corresponding plugin application is to be installed, the processor 11S determines Yes in Act 37, and proceeds to Act 38.

In Act 38, the processor 11S determines whether or not it is possible to install the corresponding plugin application. Here, the case in which it is not possible to install the plugin application is a case, for example, in which the image processing device 10S is not compatible with the plugin application for the reason that the image processing device 10S cannot operate the plugin application, or the like. Alternatively, for example, there is a case in which the number of plugin applications to be installed is limited due to a license of the plugin application, and the number reached the upper limit, or the like. Such a determination is performed, for example, by asking the image processing device 10M. When it is possible to install the corresponding plugin application, the processor 11S determines Yes in Act 38, and proceeds to Act 39.

Figure 9:
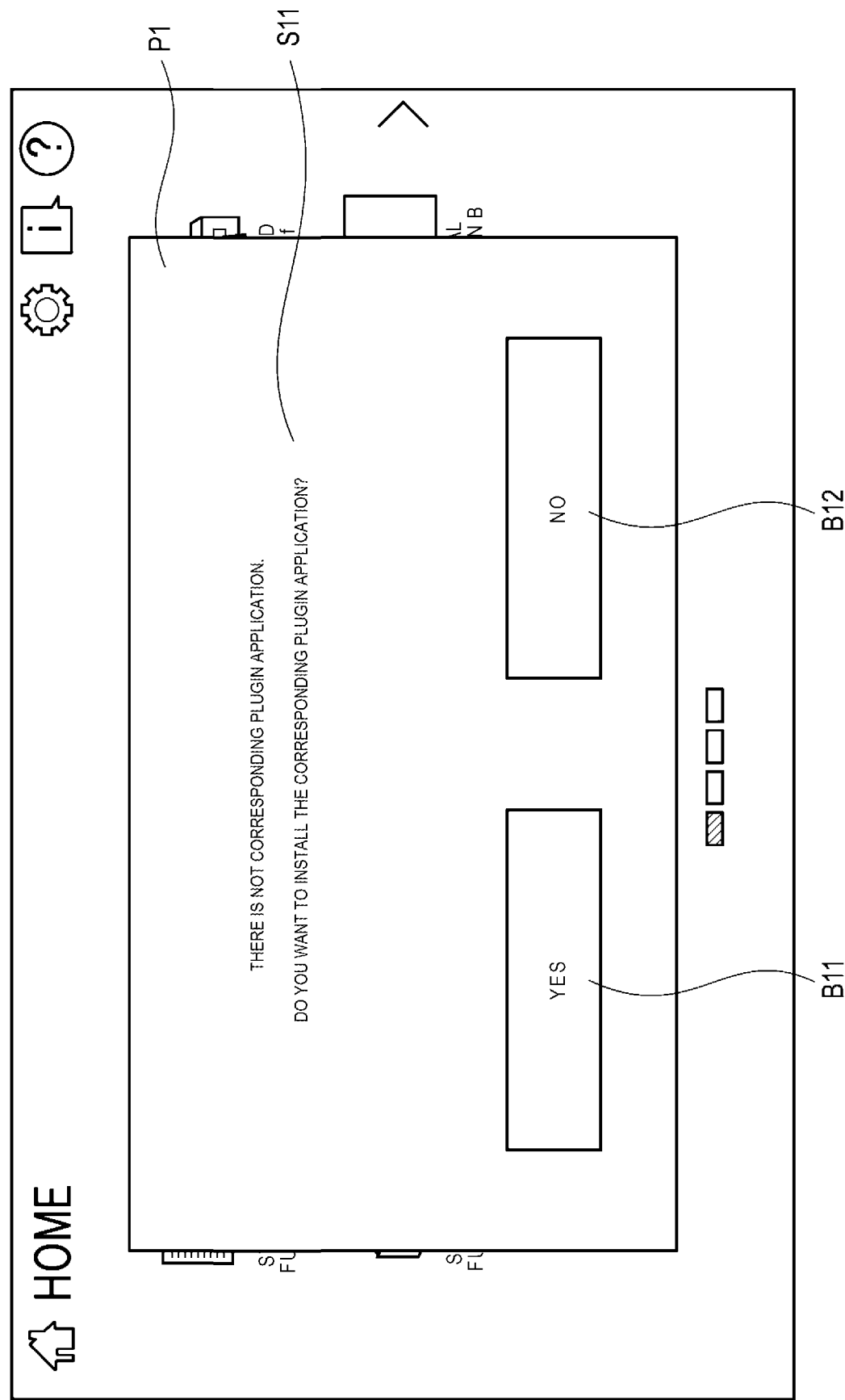
FIG. 9 illustrates an example of a screen which is displayed on the touch panel in FIG. 1.

In Act 39, the processor 11S causes the touch panel 16 to display a screen for asking an operator of the image processing device 10S whether or not the corresponding plugin application should be installed. For this reason, the processor 11S generates an image corresponding to the screen. In addition, the processor 11S instructs the touch panel 16 to display the generated image. Upon receiving the instruction, the touch panel 16 displays the screen. The screen is a screen illustrated in FIG. 9, for example. FIG. 9 illustrates an example of a screen displayed on the touch panel 16. The screen includes a popup P1. The popup P1 includes the character string S11, and the buttons B11 and B12. The character string S11 includes a character string which indicates that the corresponding plugin application is not installed, and a character string which asks whether or not to install the corresponding plugin application. An example of the character string S11 is "There is no application. Do you want to install the application?" The button B11 is a button for instructing the image processing device 10S to install the corresponding plugin application. The button B12 is a button for instructing the image processing device 10S not to install the corresponding plugin application. After the processing in Act 39, the processor 11S finishes displaying of the popup P1, and proceeds to Act 40, when the button B11 or B12 is operated.

In Act 40, the processor 11S determines whether or not to install the corresponding plugin application. When it is instructed that the installation of the corresponding plugin application is to be performed, for example, by an operation of the button B11, or the like, the processor 11S determines to install the corresponding plugin application. When the corresponding plugin application is installed, the processor 11S determines Yes in Act 40, and proceeds to Act 41.

In Act 41, the processor 11S installs the corresponding plugin application. In addition, the processor 11S obtains the corresponding plugin application to be installed from the image processing device 10M, for example. After the processing in Act 41, the processor 11S proceeds to Act 42.

In Act 42, the processor 11S sets the additional button selected in Act 35 so as to be normally displayed. That is, the processor 11S sets a value of field of a display method of the record which is selected in Act 35 to a "normal display". After the processing in Act 42, the processor 11S returns to Act 34.

Meanwhile, when the image processing device 10S is not set so that the corresponding plugin application is to be installed, the processor 11S determines No in Act 37, and proceeds to Act 43. In addition, when it is not possible to install the corresponding plugin application, the processor 11S determines No in Act 38, and proceeds to Act 43. In addition, in Act 40, when it is instructed so as not to install the corresponding plugin application, for example, by an operation of the button B12, or the like, the processor 11S determines so as not to install the corresponding plugin application. When the corresponding plugin application is not installed, the processor 11S determines No in Act 40, and proceeds to Act 43.

In Act 43, the processor 11S determines whether or not the image processing device 10S is set so that the additional button is displayed using a dotted line, to indicate that the additional function corresponding to the additional button is unusable. When the additional button is set to be displayed using a dotted line, the processor 11S determines Yes in Act 43, and proceeds to Act 44.

In Act 44, the processor 11S sets the additional button selected in Act 35 to be displayed using a dotted line. That is, the processor 11S sets a value of field of a display method of the record which is selected in Act 35 to a "dotted line display". After the processing in Act 44, the processor 11S proceeds to Act 45.

In contrast to this, when the additional button is not set to the dotted line display, in a case in which it is not possible to use the additional function corresponding to the additional button, the processor 11S determines No in Act 43, and proceeds to Act 45.

In Act 45, the processor 11S determines whether or not the additional button is set to non-display, in a case in which it is not possible to use the additional function corresponding to the additional button. When the additional button is set to non-display, in a case in which it is not possible to use the additional function corresponding to the additional button, the processor 11S determines Yes in Act 45, and proceeds to Act 46.

In Act 46, the processor 11S sets so that the additional button selected in Act 35 is set to non-display. That is, the processor 11S sets a value of field of a display method of the record which is selected in Act 35 to "non-display". After the processing in Act 46, the processor 11S returns to Act 34.

In contrast to this, when the additional button is not set to non-display in a case in which it is not possible to use the additional function corresponding to the additional button, the processor 11S determines No in Act 45, and returns to Act 42.

In this manner, the processor 11S repeats Act 34 to Act 46 until there is no additional button which is determined to be Yes in the processing in Act 34, that is, until there is no record which is to be determined to be Yes in the processing in Act 34. In addition, when there is no additional button of which a display method is not set on a customized screen related to a user who is in the middle of logging in, the processor 11S determines Yes in Act 34, and finishes the synchronization processing illustrated in FIG. 8. The processor 11S finishes the processing in Act 6 in FIG. 6 according to finishing of the synchronization processing, and proceeds to Act 7.

Figure 10:
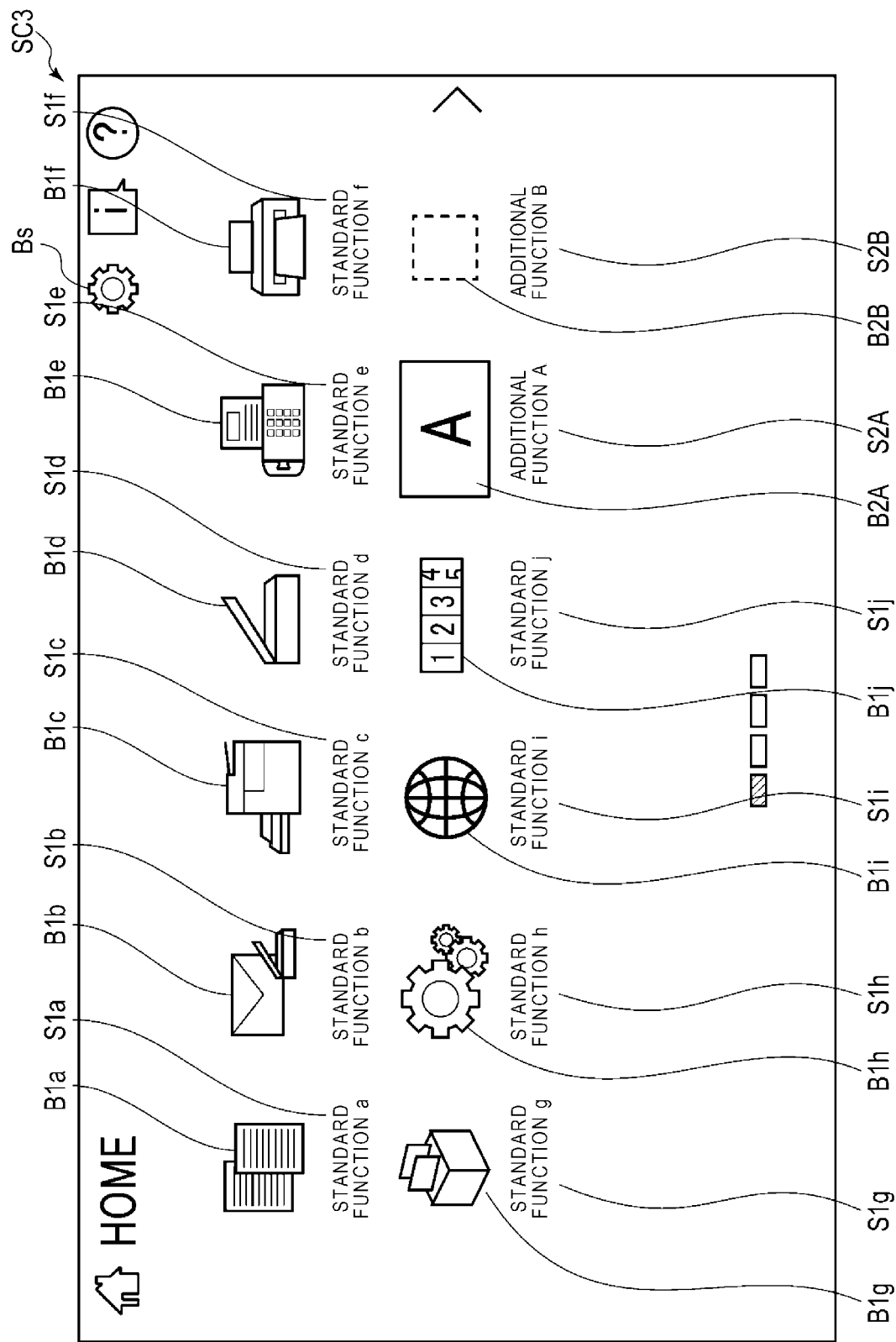
FIG. 10 illustrates an example of a customized screen which is displayed on the touch panel in FIG. 1.

In Act 7, the processor 11S generates an image corresponding to a customized screen SC3 which is illustrated in FIG. 10, with reference to the table T2. An additional button B2 corresponding to an additional function which is specified in a function ID included in a record in which a value of field of a user ID is a login user ID is displayed on the customized screen SC3. However, when a value of field of the display method of the record is the "normal display", the additional button B2 is displayed without a change in appearance, as illustrated in the additional button B2A. However, when a value of field of the display method is a "display using a dotted line", as illustrated in the additional button B2B, an appearance of the button is displayed by being changed to a dotted line. In addition, when a value of field of the display method is "non-display", the additional button B2 is not displayed on the customized screen SC3, and also the character string S2 corresponding to the additional button B2 is not displayed. In addition, the processor 11S instructs the touch panel 16 to display the generated image. Upon receiving the instruction, the touch panel 16 displays the customized screen SC3. After the processing in Act 7, the processor 11S proceeds to Act 8.

A display method of the additional button B2 when a value of field of the display method is the "normal display" is an example of a first display format. A display method of the additional button B2 when a value of field of the display method is the "display using a dotted line" is an example of a second display format.

In Act 8, the processor 11S determines whether or not the setting button Bs is operated. When the setting button Bs is not operated, the processor 11S determines No in Act 8, and proceeds to Act 9.

In Act 9, the processor 11S determines whether or not a condition for logout is satisfied. When an operation for instructing logout is performed, the processor 11S determines that the condition for logout is satisfied. Alternatively, when a non-operation time exceeds a certain time, the processor 11S determines that the condition for logout is satisfied. When the condition for logout is not satisfied, the processor 11S determines No in Act 9, and proceeds to Act 10.

In Act 10, the processor 11S determines whether or not any one of additional button B2 is operated. When the additional button is not operated, the processor 11S determines No in Act 10, and proceeds to Act 8. In this manner, the processor 11S repeats Act 8 to Act 10 until any one of buttons B2 is operated, depending on whether the setting button Bs is operated or the logout condition is satisfied.

When the setting button Bs is operated in the standby state of Act 8 to Act 10, the processor 11S determines Yes in Act 8, and proceeds to Act 11.

In Act 11, the processor 11S generates an image corresponding to the setting screen. In addition, the processor 11S instructs the touch panel 16 to display the generated image. Upon receiving the instruction, the touch panel 16 displays the setting screen. On the setting screen, a button for performing various setting, a button for returning to the customized screen SC3, or the like, is displayed. After the processing in Act 11, the processor 11S proceeds to Act 12.

In Act 12, the processor 11S determines whether or not the button for returning is operated. When the button for returning is not operated, the processor 11S determines No in Act 12, and proceeds to Act 13.

In Act 13, the processor 11S determines whether or not an operation for changing setting is performed. When the operation of instructing a change in setting is not performed, the processor 11S determines No in Act 13, and proceeds to Act 14. In this manner, the processor 11S repeats Act 12 and Act 13 until the button for returning is operated, or the operation of instructing a change in setting is performed.

When the button for returning is operated in the standby state in Act 12 and Act 13, the processor 11S determines Yes in Act 12, and returns to Act 7.

When the operation of instructing a change in setting is performed in the standby state of Act 12 and Act 13, the processor 11S determines Yes in Act 13, and proceeds to Act 14.

In Act 14, the processor 11S changes setting according to operation contents in Act 13. Here, the setting can be changed to any of the following:

(1) Setting of whether or not a corresponding plugin application should be installed. By changing the setting, whether the processor 11S determines Yes in the processing in Act 37, or determines No is changed.

(2) Setting of whether or not the additional button is displayed using a dotted line, when an additional function corresponding to the additional button is unusable. By changing the setting, whether the processor 11S determines Yes or No in the processing in Act 43 is changed.

(3) Setting of whether or not an additional button is set to non-display, when it is not possible to use an additional function corresponding to an additional button. By changing the setting, whether the processor 11S determines Yes or No in the processing in Act 45 is changed.

(4) Setting of a display method of an additional button. By changing the setting, it is possible to select an appearance of the additional button of which corresponding additional function is unusable. When changing the setting, the processor 11S rewrites the table T2 according to the change in setting.

(5) Setting of whether or not information related to the image processing device 10S in which the additional function can be used is displayed, when an additional button in which corresponding additional function is unusable is operated. By changing the setting, whether the processor 11S determines Yes or No in the processing in Act 21 is changed.

(6) Setting of whether or not an additional button is set to non-display, when the additional button in which corresponding additional function is unusable is operated. By changing the setting, whether the processor 11S determines Yes or No in the processing in Act 24 is changed.

(7) Setting of instructing a deletion of an additional button which is displayed on the customized screen SC3. When an instruction of deleting an additional button is given, the processor 11S deletes the record corresponding to the additional button from the table T2. In addition, the processor 11S transmits the table T2 to the image processing device 10M. The image processing device 10M which received the table T2 updates the table T1, and causes the table T1 to synchronize with the table T2. That is, the image processing device 10M deletes the same record as the record which is deleted in the table T2 from the table T1.

(8) Setting of instructing an addition of an additional button which is displayed on the customized screen SC3. When the instruction of adding the additional button is performed, the processor 11S adds a record corresponding to the additional button to the table T2. In addition, the processor 11S transmits the table T2 to the image processing device 10M by controlling the communication interface 15. The image processing device 10M which received the table T2 updates the table T1, and causes the table T1 to synchronize with the table T2. That is, the image processing device 10M adds the same record as the record added to the table T2 to the table T1.

After the processing in Act 14, the processor 11S returns to Act 12.

When a condition for logout is satisfied in the standby state in Act 8 to Act 10, the processor 11S determines Yes in Act 9, performs processing related to logout, and returns to Act 1.

When any one of buttons B2 is operated in the standby state in Act 8 to Act 10, the processor 11S determines Yes in Act 10, and proceeds to Act 15 in FIG. 7. In addition, the additional button B2 which is operated here is referred to as an "operation button", hereinafter.

In Act 15, the processor 11S determines whether or not it is possible to use an additional function corresponding to an operation button. In addition, the case in which it is not possible to use the additional function is, for example, a case in which a plugin application (hereinafter, referred to as "corresponding plugin application") corresponding to the additional function is not installed in the image processing device 10S. When it is possible to use the additional function corresponding to the operation button, the processor 11S determines Yes in Act 15, and proceeds to Act 20. In contrast to this, when it is not possible to use the additional function corresponding to the operation button, the processor 11S determines No in Act 15, and proceeds to Act 16.

In Act 16, the processor 11S determines whether or not it is possible to install a corresponding plugin application, similarly to Act 38. When it is possible to install the corresponding plugin application, the processor 11S determines Yes in Act 16, and proceeds to Act 17.

In Act 17, the processor 11S causes the touch panel 16 to display a screen which asks an operator of the image processing device 10S whether the corresponding plugin application should be installed or not, similarly to Act 39. After the processing in Act 17, when the button B11 or B12 is operated, the processor 11S finishes a display of the popup P1, and proceeds to Act 18.

In Act 18, the processor 11S determines whether or not to install the corresponding plugin application, similarly to Act 40. When the corresponding plugin application is to be installed, the processor 11S determines Yes in Act 18, and proceeds to Act 19.

In Act 19, the processor 11S installs the corresponding plugin application, similarly to Act 41. After the processing in Act 19, the processor 11S proceeds to Act 20.

In Act 20, the processor 11S executes an additional function corresponding to the operation button. After the processing in Act 20, the processor 11S returns to Act 7 in FIG. 6.

Meanwhile, when it is not possible to install the corresponding plugin application, the processor 11S determines No in Act 16 in FIG. 7, and proceeds to Act 21. In addition, in Act 18, when it is instructed so as not to install the corresponding plugin application, by operating the button B12, or the like, the processor 11S determines not to install the corresponding plugin application. When the corresponding plugin application is not installed, the processor 11S determines No in Act 18, and proceeds to Act 21.

In Act 21, when the additional button in which a corresponding additional function is unusable is operated, the processor 11S determines whether or not information related to the image processing devices 10 which can use the additional function is set to be displayed. When it is set so that the information related to the image processing devices which can use the additional function is to be displayed, the processor 11S determines Yes in Act 21, and proceeds to Act 22.

Figure 11:
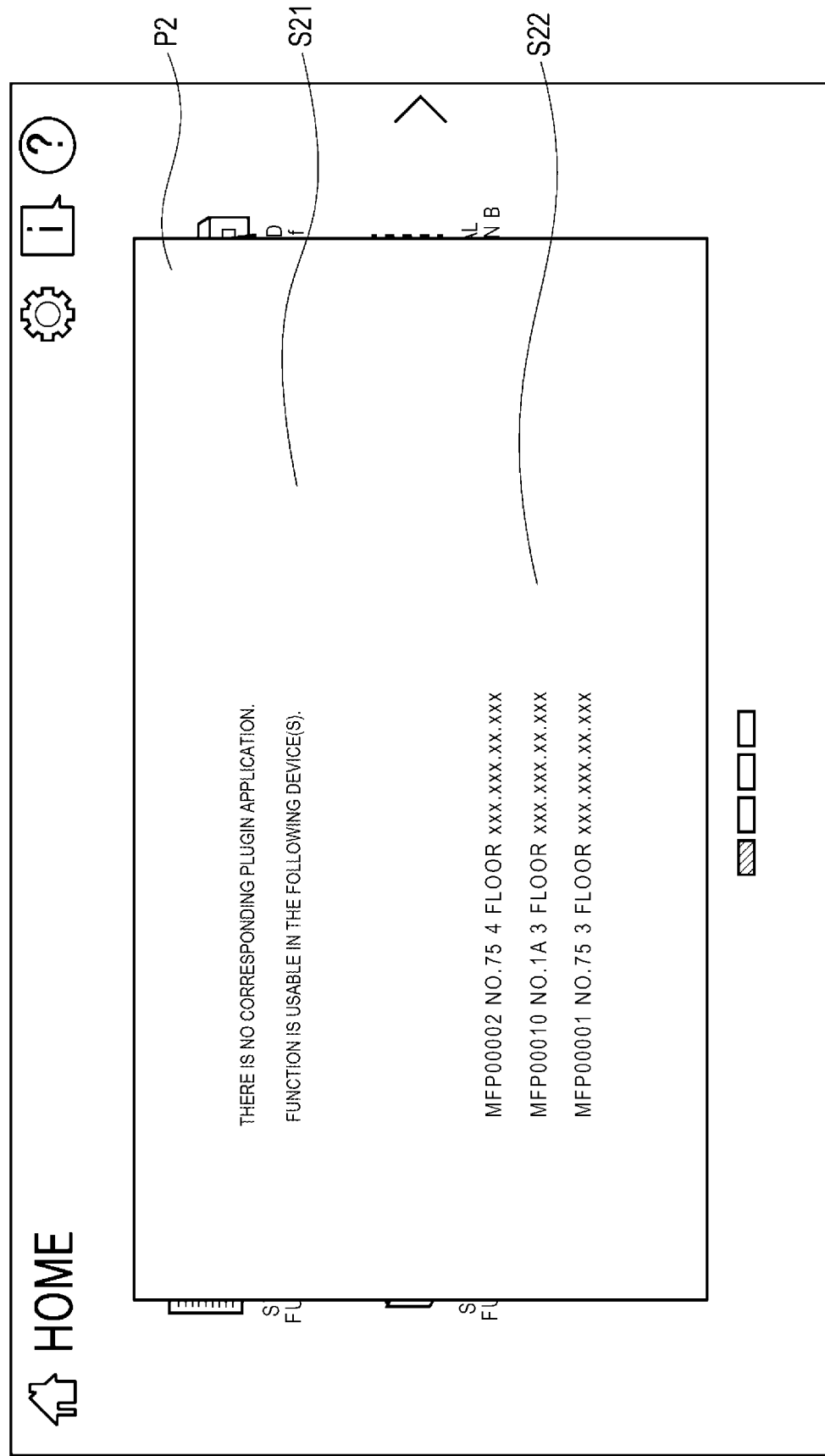

In Act 22, the processor 11S causes the touch panel 16 to display a screen containing the information related to the image processing devices 10 which can use the additional function. For this reason, the processor 11S generates an image corresponding to the screen. In addition, the processor 11S instructs the touch panel 16 to display the generated image. Upon receiving the instruction, the touch panel 16 displays the screen. The screen is, for example, the screen illustrated in FIG. 11. FIG. 11 illustrates an example of a screen which is displayed on the touch panel 16. The screen includes the popup P2. The popup P2 includes character strings S21 and S22. The character string S21 includes a character string which indicates that a corresponding plugin application is not installed. In addition, the character string S21 includes a character string which indicates that it is possible to use the additional function in the image processing device 10 which is illustrated in the character string S22. An example of the character string S21 is "There is no application. The application is usable in the following device(s)." The character string S22 illustrates a list of image processing devices 10 which can use the additional function. In addition, there is a case in which the image processing device 10 displayed in the character string S22 includes both the image processing device 10S and the image processing device 10M. In the list, a device ID, an installation location, and an IP address are denoted in each of the image processing devices 10. In addition, the list can be obtained by making an inquiry with respect to the image processing device 10M. After the processing in Act 22, the processor 11S proceeds to Act 23.

In ACT 23, when an operation for closing the popup P2, for example, an operation in which a margin of the popup P2 is operated, or the like, is performed, the processor 11S finishes a display of the popup P2, and returns to Act 7 in FIG. 6.

Meanwhile, when the image processing device 10S is set to not display the information related to the image processing device 10 in which the additional function can be used, the processor 11S determines No in Act 21, and proceeds to Act 24.

In Act 24, when an additional button in which a corresponding additional function is unusable is operated, the processor 11S determines whether or not the image processing device 10S is set so as to ask whether or not the additional button should be set to non-display. When the image processing device 10S is set to not ask whether or not the additional button should be set to non-display, the processor 11S determines No in Act 24, and returns to Act 7 in FIG. 6. In contrast to this, when the image processing device 10S is set so as to ask whether or not the additional button should be set to non-display, the processor 11S determines Yes in Act 24, and proceeds to Act 25 in FIG. 7.

In Act 25, the processor 11S causes the touch panel 16 to display a screen for asking whether or not the operation button in which the corresponding additional function is unusable should be set to non-display. For this reason, the processor 11S generates an image corresponding to the screen. In addition, the processor 11S instructs the touch panel 16 to display the generated image. Upon receiving the instruction, the touch panel 16 displays the screen. The screen is a screen illustrated in FIG. 12. FIG. 12 illustrates an example of a screen which is displayed on the touch panel 16. The screen includes a popup P3. The popup P3 includes a character string S31, and buttons B31 and B32. The character string S31 includes a character string which indicates that a corresponding plugin application is not installed, and a character string which asks whether or not the operation button in which a corresponding additional function is unusable, should be set to non-display. An example of the character string S31 is "There is no application. Do you want to make the button non-display?" The button B31 is a button for instructing that the operation button is to set to non-display. The button B32 is a button for instructing that the operation button is to set to non-display. When the buttons B31 and B32 are operated, the processor 11S finishes a display of the popup P3 after the processing in Act 25, and proceeds to Act 26.

In Act 27, the processor 11S determines whether or not the operation button should be set to non-display. When it is instructed so that the operation button should not be set to non-display, for example, by operating the button B32, or the like, the processor 11S determines that the operation button should not be set to non-display. When the operation button should not be set to non-display, the processor 11S determines No in Act 27, and returns to Act 7 in FIG. 6. In contrast to this, when it is instructed so that the operation button should be set to non-display, for example, by operating the button B31, or the like, the processor 11S determines that the operation button should be set to non-display. When the operation button should be set to non-display, the processor 11S determines Yes in Act 27, and proceeds to Act 28.

In Act 28, the processor 11S sets the operation button to non-display. That is, the processor 11S sets a value of field of a display method of a record corresponding to the operation button to "non-display", by rewriting the table T2. After the processing in Act 28, the processor 11S returns to Act 7 in Act 6.

Hitherto, the operation of the image processing device 10S was described; however, the image processing device 10M can also perform the same operation as that of the image processing device 10S. However, in this case, the processor 11M performs processing instead of the processor 11S. In addition, in the above descriptions of operations, when it is necessary to receive data from the image processing device 10M, the image processing device 10S obtain the data through the network NW. However, such a process is not necessary for the image processing device 10M, and the image processing device 10M performs processing by reading data which is stored in its own auxiliary storage device 14, instead of obtaining the data from another image processing device.

As described above, there is a case in which a display method (normal display, non-display, or display using dotted line) of additional buttons becomes different; however, for the same registered user, the additional buttons which are displayed on a customized screen are synchronized between a plurality of image processing devices 10.

According to the image processing system 1 of the embodiment, the image processing device 10 sets a display of an additional button corresponding to an additional function that cannot be used, to a display using a dotted line. Since the additional button is set to the display using a dotted line, it gets a lower degree of attention from the user. Accordingly, in the image processing device 10, it is less likely that a user will operate an additional button which corresponds to an unusable additional function.

In addition, according to the image processing system 1, the image processing device 10 sets a display of the additional button in which a corresponding additional function is unusable to non-display. Since it is set to non-display, a user does not even know of the presence of the additional button. Accordingly, in the image processing device 10, it is not possible for a user to operate the additional button which corresponds to the additional function which is unusable.

In addition, according to the image processing system 1 in the embodiment, the image processing device 10 can set a display method of an additional button in which a corresponding additional function is unusable. In addition, the image processing device 10 displays the additional button using a display method corresponding to the setting. Alternatively, the image processing device 10 sets the additional button to non-display according to the setting. Accordingly, a registered user can set an additional button in which a corresponding additional function is unusable to a display or non-display, using a desired display method.

According to the image processing system 1 in the embodiment, when an additional button in which a corresponding additional function is unusable is operated, the image processing device 10 sets the additional button to non-display. Accordingly, the image processing device 10 can prevent the user from again operating the additional button corresponding to the additional function which is unusable.

According to the image processing system 1 in the embodiment, when there is an additional button in which a corresponding additional function is unusable, the image processing device 10 installs a plugin application corresponding to the additional function, so that it becomes possible to use the additional function. As a result, the additional button no longer corresponds to an additional function which is unusable.

According to the image processing system 1 in the embodiment, when there is an additional button in which a corresponding additional function is unusable, the image processing device 10S displays information related to an image processing device 10 in which it is possible to use the additional function. In this manner, a user who sees the information can move to the image processing device 10 which is identified in the information. Accordingly, the user is prevented from further operating the additional button in the image processing device 10S in which the additional button which corresponds to the additional function which is unusable.

The above described embodiment also can be modified as follows.

In the above described embodiment, the image processing device 10 performs a display using a dotted line, as a display method of an additional button in which a corresponding additional function is unusable; however, it is not limited to this. For example, the image processing device 10 can use at least one of methods of using a dotted line, performing grayout, lowering opacity, lowering chroma, performing a reduced display, changing to a substitute icon which indicates that it is unusable, and changing a display using a method other than those. In addition, it may be a display method in which a plurality of the methods are combined. In addition, a display method may be selected using setting from a plurality of types of these. A display method of these is an example of the second display format.

In the above described embodiment, when an additional button in which a corresponding additional function is unusable is operated, the image processing device 10 sets the additional button to non-display by performing a setting of non-display in Act 27. However, the image processing device 10 may change the display method by setting the additional button to the display using a dotted line, instead of setting the additional button to non-display.

For the additional function, an information column for displaying specific information may be used, instead of displaying additional buttons on the customized screen. When a normal display is used in the display method, the information column displays information on the image processing device 10 in real time, or at a specific timing. The information is, for example, information which indicates a temperature, or the number of printing sheets of the image processing device 10, fault information, or information which indicates a state of toner of the image processing device, though it is not limited. Alternatively, the information may be news, or the like, which is obtained through the network NW. When a display method is the display using a dotted line, a user is unable to use the information column. The information column is an example of an object. In addition, there may be an additional function for displaying an object other than that, without being limited to the additional button, and the information column. The other object is an image, a moving image, or the like, for example.

In the above described embodiment, an additional button corresponds to an additional function. However, the additional button may be a button which executes a function which is originally installed in the image processing device 10. That is, the additional button may be a button which can be added and deleted depending on setting of a registered user.

In the above described embodiment, the image processing device 10 obtains a plugin application which will be installed from the image processing device 10M. However, the image processing device 10 may obtain the plugin application from a removable storage device, or the like, which is connected to the image processing device 10. Alternatively, the image processing device 10 may obtain the plugin application from a personal computer (PC) which is connected to the network NW, a server, or the like.

A network architecture of the image processing system in the embodiment can be a client-server model. That is, the image processing device 10S is a client, and the image processing device 10M is a server. However, the network architecture of the image processing system in the embodiment is not limited to the client-server model. For example, the network architecture of the image processing system in the embodiment may be a peer to peer (P2P) model. In this case, the image processing device 10 is operated without distinction of master and slave, for example. In addition, a user DB is stored by a plurality of image processing devices 10 using a mechanism such as a distributed file system, or a distributed data store, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming device comprising:
   a communication interface communicable with one or more image forming devices in an image forming device network;
   a printer configured to form an image on a medium;
   a display;
   a memory in which first information indicating one or more function IDs of one or more image forming device functions associated with a user ID is stored; and
   a processor configured to:
      receive, through the communication interface, second information indicating one or more function IDs of one or more image forming device functions available in another image forming device in the image forming device network, the second information being associated with the user ID;
      determine whether or not an image forming device function identified by a function ID included in the second information and not included in the first information is available in the image forming device;
      set a display format of an item corresponding to the image forming device function identified by the function ID to a first display format, when determining that the image forming device function identified by the function ID is available in the image forming device, and to a second display format that is different from the first display format, when determining that the image forming device function identified by the function ID is not available in the image forming device;
      update the first information in the memory by adding the function ID in association with the set display format and the user ID;
      cause the display to display a screen with the item corresponding to the image forming device function identified by the function ID in the set display format, upon login of a user identified by the user ID to the image forming device; and
      operate to perform the image forming device function identified by the function ID in response to a user operation on the item displayed in the displayed screen in the first display format during the login of the user identified by the user ID.

2. The image forming device according to claim 1, wherein a line of the item is displayed by a solid line in the first display format, and by a dashed or dotted line in the second display format.

3. The image forming device according to claim 1, wherein a portion of the item is displayed in black color in the first display format, and in gray color in the second display format.

4. The image forming device according to claim 1, wherein no item corresponding to the image forming device function identified by the function ID is included in the screen in the second display format.

5. The image forming device according to claim 1, wherein the image forming device is a slave image forming device, and said another image forming device is a master image forming device.

6. The image forming device according to claim 1, wherein the processor is configured to compare the first information with the second information to determine whether or not there is the image forming device function identified by the function ID included in the second information and not included in the first information.

7. A method of controlling an image forming device included in an image forming device network of a plurality of image forming devices comprising:

storing, in a memory, first information indicating one or more function IDs of one or more image forming device functions associated with a user ID;

receiving, through a communication interface, second information indicating one or more function IDs of one or more image forming device functions available in another image forming device in the image forming device network, the second information being associated with the user ID;

determining whether or not an image forming device function identified by a function ID included in the second information and not included in the first information is available in the image forming device;

setting a display format of an item corresponding to the function identified by the function ID to a first display format, when determining that the image forming device function identified by the function ID is available in the image forming device, and to a second display format that is different from the first display format, when determining that the image forming device function identified by the function ID is not available in the image forming device;

updating the first information in the memory by adding the function ID in association with the set display format and the user ID;

causing a display to display a screen with the item corresponding to the image forming device function identified by the function ID in the set display format, upon login of a user identified by the user ID to the image forming device; and operating to perform the image forming device function identified by the function ID in response to a user operation on the item displayed in the displayed screen in the first display format during the login of the user identified by the user ID.

8. The method according to claim 7, wherein a line of the item is displayed by a solid line in the first display format, and by a dashed or dotted line in the second display format.

9. The method according to claim 7, wherein a portion of the item is displayed in black color in the first display format, and in gray color in the second display format.

10. The method according to claim 7, wherein no item corresponding to the image forming device function identified by the function ID is included in the screen in the second display format.

11. The method according to claim 7, wherein the image forming device is a slave image forming device, and said another image forming device is a master image forming device.

12. The method according to claim 7, further comprising:

comparing the first information with the second information to determine whether or not there is the image forming device function identified by the function ID included in the second information and not included in the first information.

* * * * *